US006881105B1

(12) United States Patent
Frietsch

(10) Patent No.: US 6,881,105 B1
(45) Date of Patent: Apr. 19, 2005

(54) METHOD FOR MANUFACTURE OF MICROSLIDING CONTACTS

(75) Inventor: Klaus Frietsch, Schramberg (DE)

(73) Assignee: Hugo Kern und Liebers GmbH & Co. Platinen und Federnfabrik, Schramberg-sulgen (DE)

(*) Notice: Subject to any disclaimer, the term of this patent is extended or adjusted under 35 U.S.C. 154(b) by 63 days.

(21) Appl. No.: 10/299,011

(22) Filed: Nov. 19, 2002

(30) Foreign Application Priority Data

Nov. 23, 2001 (DE) ........................................ 101 57 320

(51) Int. Cl.[7] ........................... H01R 9/24; B23K 26/00
(52) U.S. Cl. ................................... 439/887; 219/121.64
(58) Field of Search ................................ 439/862, 884, 439/886, 887, 874, 930; 219/121.6, 121.63, 121.64, 121.65, 121.66

(56) References Cited

U.S. PATENT DOCUMENTS

| | | | | |
|---|---|---|---|---|
| 5,189,278 A | * | 2/1993 | Frietsch | 219/121.66 |
| 5,243,757 A | | 9/1993 | Grabbe et al. | |
| 6,386,959 B1 | * | 5/2002 | Uruburu | 451/107 |
| 2001/0024735 A1 | | 9/2001 | Kuhlmann-Wilsdorf et al. | |

FOREIGN PATENT DOCUMENTS

| | | |
|---|---|---|
| DE | 1 848 278 | 3/1962 |
| DE | 199 13 246 | 9/2000 |
| GB | 1 180 715 | 2/1970 |
| JP | 6 76914 | 3/1994 |
| JP | 6 275356 | 9/1994 |
| JP | 06-275356 | 9/1994 |
| JP | 06283245 | 10/1994 |
| JP | 07006844 | 1/1995 |
| JP | 09-260007 | 10/1997 |
| JP | 09260007 | 10/1997 |
| JP | 2000060071 | 2/2000 |

OTHER PUBLICATIONS

*Bull. Ass. Suisse electr.t.48*, No. 20, pp. 895–986 (1957).

* cited by examiner

*Primary Examiner*—Khiem Nguyen
(74) *Attorney, Agent, or Firm*—Nath & Associates PLLC; Gary M. Nath; Gregory B. Kang

(57) ABSTRACT

In the case of microsliding contacts with several contact springs which have contact surfaces providing the contact, the contact springs are manufactured from an alloy of at least one non-noble metal. A coating of an alloy containing at last one noble metal is applied onto the contact surfaces by means of buildup welding.

7 Claims, 4 Drawing Sheets

Figure 1:
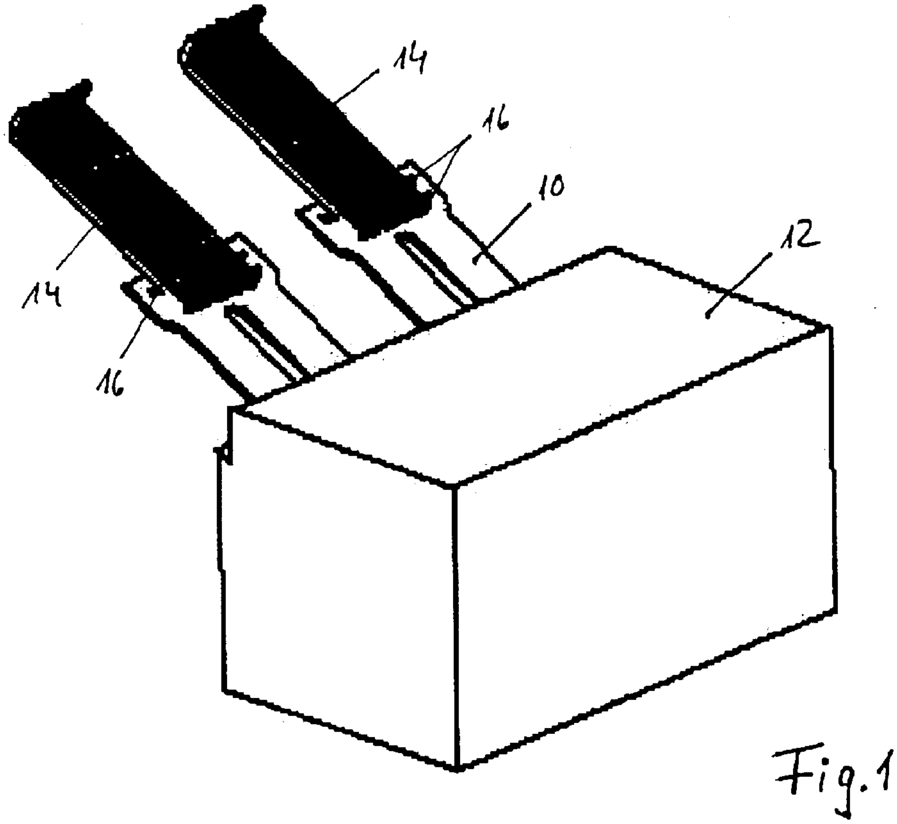

DETAIL A
50:1

DETAIL A
50:1

METHOD FOR MANUFACTURE OF MICROSLIDING CONTACTS

The invention pertains to a method for manufacture of microsliding contacts according to the preamble of claim 1 and also to a microsliding contact manufactured according to this method.

Microsliding contacts are used for contacting of circuit paths or surfaces, and frequently a relative movement between the microslide contacts and the circuit path or surface will occur. In order to achieve a reliable contact, the microsliding contacts consist of several contact springs, which are located as tightly side by side as possible. The contact springs, for example, can be designed as spring tongues which are punched out from sheet metal bands of spring steel. A more dense arrangement of contact springs, i.e., a greater number of contact springs per surface area, can be attained by the use of round wires as contact springs.

In addition to electrical conductance, corrosion resistance is important for the contact spring and wear resistance with moved sliding contacts. As is already known, the contact springs can be manufactured from spring bronze or steel. These materials are low in cost and are useful in regard to their electrical conductance, their spring properties and their wear resistance. However, the corrosion resistance of these materials is not sufficient for all applications. Therefore, it is also state of the art to manufacture the contact springs from a noble metal alloy. These contact springs are quite suitable in terms of their mechanical and electrical properties and have a high wear strength and corrosion resistance. But the disadvantage is the relatively high material costs. As a compromise, contact springs can also be manufactured as punched sheet metal parts using an economical spring metal and then noble metal parts can be introduced by roll cladding or front edge plating into the regions of the contact springs where the contact surfaces are found. This manufacturing method indeed uses only a small quantity of noble metal, so that the material costs are reduced, but the plating is an additional, complicated work step which again essentially negates the advantage of reducing the material costs.

Therefore, the invention is based on the problem of creating a method in which microsliding contacts of high quality can be manufactured at lost cost.

This problem is solved according to this invention by a method with the properties of claim 1.

Favorable designs of the method are indicated in the dependent claims.

Furthermore, the invention pertains to a microsliding contact manufactured according to this method.

According to the invention, the contact springs of the microsliding contact are manufactured from an alloy of at least one non-noble metal. The contact surfaces are coated by buildup welding, with an alloy that contains at least one noble metal. Thus it is possible to produce the contact springs from a low-cost material. The high wear resistance and corrosion resistance, which are needed for the contact surfaces, can be obtained in that these contact surfaces are coated with an alloy containing a noble metal. The coating takes place by buildup welding. Thus it is possible to apply a very thin layer of the noble metal alloy so that only the smallest possible quantity of the expensive noble metal alloy is needed. Buildup welding is simple from a manufacturing standpoint, so that this work step increases the manufacturing costs only to a minor extent in comparison to the savings in material costs.

For the buildup welding, the alloy containing the noble metal is applied preferably as a powder onto the contact surface, for example, it can be blown on by a powder conveyor. The powder that collects on the contact surface can then be fused on preferably by a laser beam. The buildup welding should be carried out preferably under inert gas.

The application of the coating onto the contact surface by fusion welding has the additional advantage that the edges of the contact springs in the region of the contact surface will likewise be fused on and rounded off. An additional deburring of the contact springs is thus not necessary.

The layer thickness of the noble metal alloy applied by the buildup welding can be very thin and should be preferably only about 20 to 50 $\mu$m. A thin layer of this kind is sufficient to ensure the corrosion resistance and wear resistance. On the other hand, this thin layer thickness means a small requirement of the expensive noble metal alloy.

The method according to this invention for coating of the contact surface can be used both for contact springs that are obtained from punched sheet metal, and also for contact springs that are made from round wires. The application of the noble metal alloy as metal powder has the advantage that the metal powder can be applied in a simple manner onto the horizontally positioned contact surface. The powder that does not adhere to the contact surfaces can be collected beneath the contact springs and used for subsequent processing. Likewise, any excess powder will slide off to the side of the contact surfaces and will also be collected for subsequent use. After the pile-up of the powder on the contact surfaces, it can be exposed to a pulsed laser beam which will melt the metal powder and preferably the surface of the contact springs, and a surface of the now liquefied noble metal alloy will form which after solidification will ensure a uniform formation of the contact surface.

If the contact spring is designed as a punched article, then the punching will necessarily cause a spacing gap between the individual spring tongues of the contact springs. Any excess powder after the powder application will fall downward through these spacer gaps. Even in the case of contact springs that are formed from round wires, the excess powder will fall between the contact springs when the round wires are positioned at a distance from each other. If round wires are tightly packed together, so that they are touching each other in order to have the greatest possible number of contacts per surface area, then the metal powder under some circumstances cannot fall entirely between the individual contact surfaces of the round wires. In this case, it may be useful to run the contact springs formed by the round wires over an inclined ramp, so that the contact surfaces of the round wires will be each lifted individually. Now the powder can be applied to each elevated contact surface and then fused on by using the pulsing laser beam.

When using round wires it is also possible to use sheathed wires for the contact springs; these wires have a core made of a non-noble metal and can be coated galvanically, for example, with a noble metal alloy. Thus, the corrosion resistance will be assured, even in the sheath surface which is not being used as contact surface. During the melting process, the coating of the contact surface at the perimeter will be bonded to the sheath of the round wire, so that an enclosed corrosion-resistant coating will be obtained.

The invention will be explained in greater detail below based on one design example that is illustrated in the figures. We have:

FIG. 1, an enlarged, perspective illustration of a microsliding contact.

Figure 2:
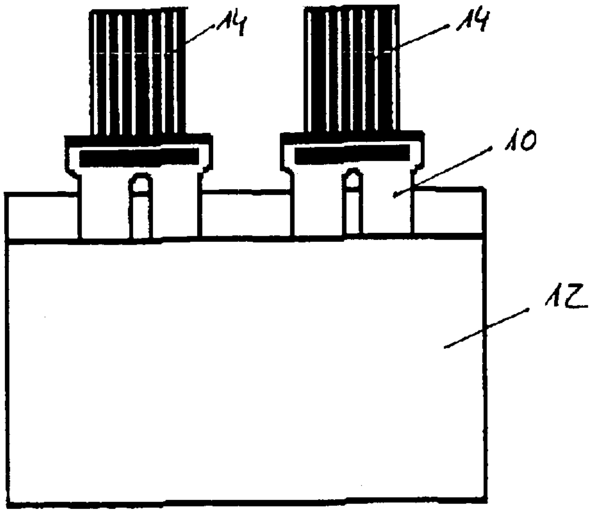

FIG. 2, a top view of the microsliding contact

Figure 3:
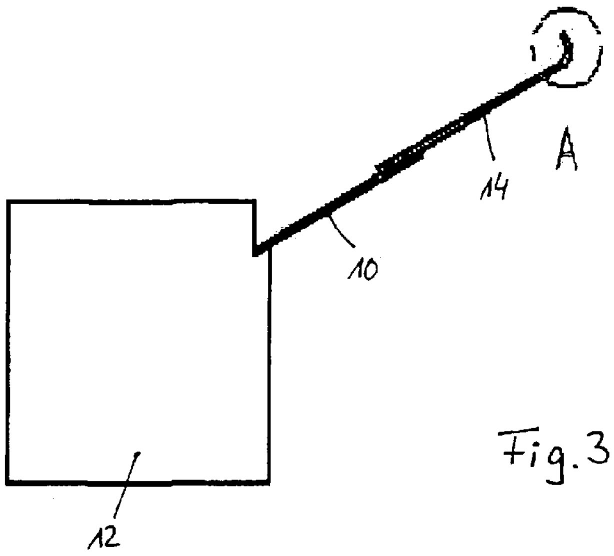

FIG. 3, a side view of the microsliding contact.

Figure 4:
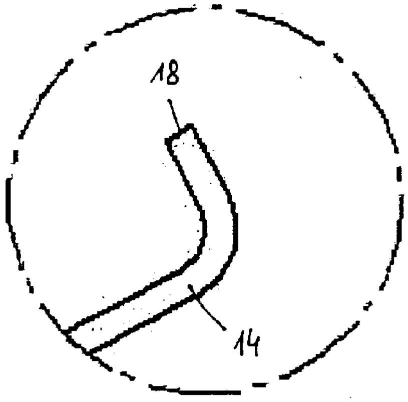

FIG. 4, an enlargement of the detail A of FIG. 3 showing a state of the art design.

Figure 5:
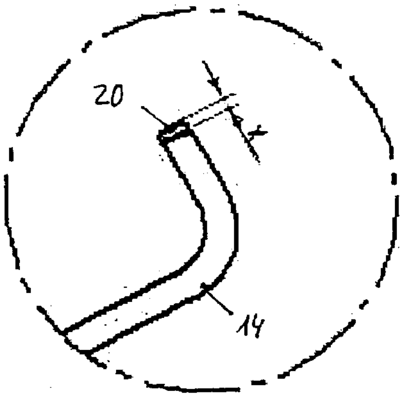
Figure 6:
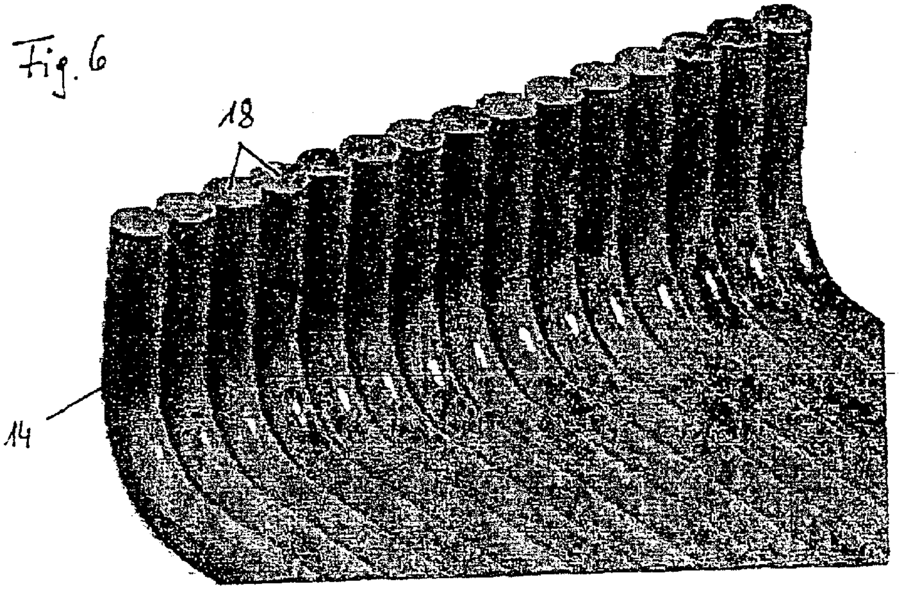
Figure 7:
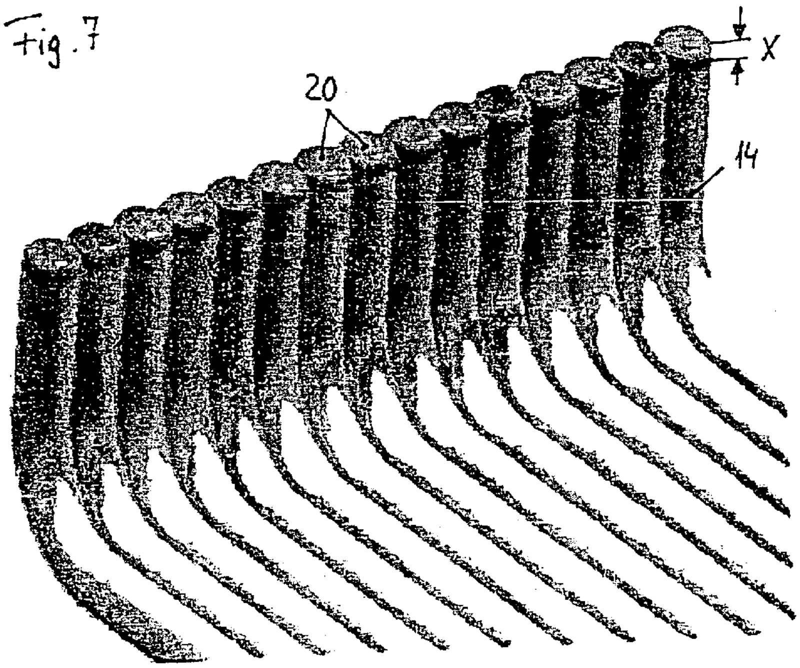
Figure 8:
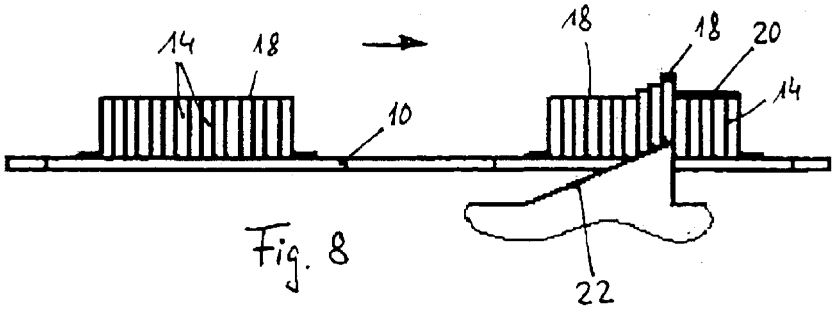
Figure 9:
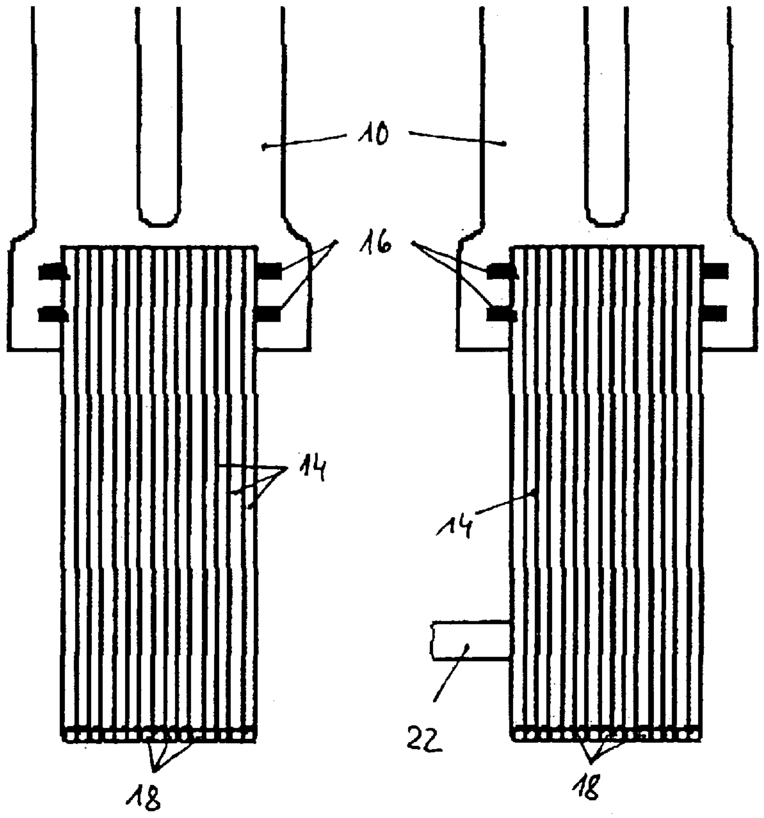

FIG. 5, an illustration of detail A from FIG. 4 according to this invention FIG. 6, a greatly enlarged photo of the detail A according to the state of the art FIG. 7, a corresponding photo of detail A according to the invention FIG. 8, an explanation of the manufacturing process, presented in a side view, and FIG. 9, a top view of FIG. 8.

FIGS. 1 to 3 present one example of a microsliding contact in which the manufacturing method according to this invention has been used.

A U-shaped punched article 10 made of sheet metal, for example, steel or a copper-beryllium alloy, is installed in a support block 12. On the free leg of the U-shaped punched article 10 some contact springs are welded on which are designed as round wires 14 in the illustrated example. The rear ends of the round wires 14 are welded to stamping ribs 16 of the punched article 10. The free ends of the round wires 14 are bent off at a right angle so that the terminal, front surfaces of the round wires 14 form contact surfaces 18 so that the round wires 14 are seated upon circuit paths (not illustrated). In this manner, the microsliding contact can join two circuit paths together via the contact surfaces 18, the round wires 14 and the U-shaped punched article 10.

In the illustrated design example, several round wires 14, for example, fifteen round wires 14 with a diameter of about 0.1 mm can be placed side by side and are positioned to touch each other. In this manner, a large number of contact points can be placed side by side on a relatively small width of two millimeters, for example. It is evident that instead of the round wires 14, spring tongues punched out from the sheet metal of the punched article 10 can be used as contact springs. By punching out the spring tongues, a gap will be left between them so that the number of contact springs that can be placed side by side on a given width will be fewer in this kind of design.

Since the contact surfaces 18 have to provide a surface contact with the particular circuit path, there is a danger that the transfer resistance of this surface contact will increase due to corrosion. If a relative movement occurs between the contact surfaces 18 and the particular conductor surfaces with which they are in contact, then the problem of wear and abrasion of the contact surfaces 18 will also come up.

For these reasons, according to the state of the art it is known to manufacture the round wires 14 from an alloy containing at least one noble metal. An alloy of this kind can contain, for example, platinum, palladium, gold, silver and copper or a selection of these elements. In order to keep the consumption of the expensive noble metal alloy small, the U-shaped punched article 10 is manufactured from an economical material and the expensive noble metal alloy is used only for the round wires 14 welded as contact springs onto the punched article 10. Due to the used noble metal, the contact surfaces 18 of the round wires 14 will be wear-resistant and corrosion-resistant. FIGS. 4 and 6 show the free ends of the round wires 14 with the contact surfaces 18 of a state of the art microsliding contact.

According to the invention, however, a low-cost material is used even for the contact springs, i.e., for the round wires 14 in the illustrated design example, provided this material has the suitable electrical conductivity and suitable spring properties. For example, a spring bronze and in particular a copper-beryllium alloy can be used. Since this material does not have the required high wear resistance and corrosion resistance, according to the invention a coating 20 is applied to the contact surfaces 18; this coating consists of an alloy that contains at least one noble metal. The coating 20 thus forms the contact surface with which the round wires 14 make the spring contact with the circuit path. FIGS. 5 and 7 show the free ends of the round wires 14 with the coating 20 in a representation that corresponds to the state of the art illustration presented in FIGS. 4 and 6.

To produce the coating 20, the alloy containing the noble metal is applied as a metal powder onto the contact surfaces 18 of the free ends of the round wires 14 pointing vertically upright. Next, the contact surfaces 18 with the metal powder piled thereon are exposed under inert gas to a laser beam, preferably a pulsed laser beam. Thus, the metal powder and the surface of the contact surfaces 18 of the round wires 14 will be melted so that they can bond together. In this manner, the coating 20 made of an alloy containing the noble metal is applied by means of laser buildup welding.

In order to apply the metal powder of the alloy containing the noble metal onto the contact surfaces 18, the metal powder is preferably blown onto the contact surfaces 18 by means of a known powder conveyor and is piled up there. Due to the horizontal position of the contact surfaces 18, a sufficient quantity of the metal powder will adhere to these contact surfaces 18. By melting the metal powder with the laser beam, a surface of the liquid noble metal alloy is produced which results in a uniform, smooth coating 20 after solidification, which coating has the optimum contact properties. This coating 20 is seen most clearly in FIG. 7.

If the contact springs are formed from punched out spring tongues or if round wires 14 are used which are spaced from each other (in contrast to the illustrated design example), then the metal powder that does not arrive onto the contact surface 18, and any excess metal powder, will fall off to the side from the contact surface 18 onto the contact springs. The metal powder can be collected there and reused.

If round wires 14 placed tightly together are used, as is shown in the illustrated design example, then there is a danger that the powder of noble metal alloy applied onto the contact surfaces 18 will bridge the contact surfaces 18 of mutually touching round wires 14 and when melted, will produce a coating that joins the mutually touching round wires 14 which would then prevent the needed mutual mobility of the individual round wires 14.

In order to avoid this problem, the method can be modified in such a manner as that illustrated in FIGS. 8 and 9. During the laser buildup welding of the coating 20, the row of round wires 14 located side by side is moved over a ramp 22. The direction of motion is indicated by an arrow in FIG. 8. If the round wires 14 are moved transverse to their axis over the ramp 22, then the round wires 14 will be lifted individually, in sequence, with respect to the neighboring round wires 14, as is indicated in FIG. 8. The powder of the noble metal alloy on the round wire 14 lifted upward, will be welded to the contact surface 18 by means of the pulsed laser beam. Since the contact surface 18 of the particular, elevated round wire 14 is separated vertically from the contact surface 18 of the neighboring round wire 14, the application of the metal powder and the melting of the coating 20 can proceed in the same manner without the formation of bridges mentioned above, just as is the case for mutually separated contact springs.

In the case of microsliding contacts like those often encountered in practice, the round wires 14 have a diameter of 0.1 mm, for example. The material thickness of the coating 20 indicated by an "X" in FIG. 5, is less than the diameter of the wire. Preferably, the thickness X of the coating 20 will be 10% to 50% of the diameter of the wire.

Thus a thickness X of the coating 20 will be obtained which in most cases will be about 20 to 50 $\mu$m. This thickness of the coating 20 can be obtained in manufacturing, as a rule, since only an appropriate quantity of the powder of the noble metal alloy can be applied onto the contact surfaces 18 of the round wires 14.

In another design (not illustrated) the round wires 14 can also be formed as sheath wires. They have a core made of low-cost material, for example, spring bronze, which is coated with a sheath of a stainless steel alloy, for example, it is galvanically coated. The sheath has a correspondingly small wall thickness. During buildup welding of the coating 20, the molten metal powder on the contact surface 18 joins with the material of the sheath at the outer edge of the contact surface 18, so that a completely melted coating and encasing of the round wires 14 with an alloy containing noble metal is obtained.

List of Reference Symbols

10 U-shaped punched article
12 Carrier block
14 Round wires
16 Stamped ribs
18 Contact surfaces
20 Coating
22 Ramp

What is claimed is:

1. Method for manufacture of microsliding contacts which feature several contact springs with contact surfaces providing the contact, characterized in that the contact springs (14) are manufactured from an alloy of at least one non-noble metal and that a coating (20) of an alloy containing at least one noble metal is applied onto the contact surfaces (18) of the contact springs (14);

characterized in that the coating (20) is applied by means of buildup laser welding;

characterized in that the coating (20) of an alloy containing at least one noble metal is applied as a metal powder onto the contact surface (18); and characterized in that the metal powder is blown on by a powder conveyor.

2. Method according claim 1, characterized in that the buildup laser welding is carried out under inert gas.

3. Method according to 1, characterized in that the contact springs (14) are made of spring bronze, in particular of beryllium bronze.

4. Method according to 1, characterized in that the alloy for the coating (20) contains one or more of the metals platinum, palladium, gold and silver.

5. Method according to claim 4, characterized in that the alloy of the noble metals contains copper.

6. Method according to 1, where the contact springs are formed by round wires, characterized in that the round wires (14) are sheathed wires which have a core made of the alloy of at least one non-noble metal and a sheath of an alloy having at least one noble metal.

7. Method according to 1, where the contact springs are mutually touching round wires, characterized in that the individual round wires (14) following one another have their contact surface (18) elevated above the contact surfaces (18) of the neighboring round wires (14) and that the buildup welding of the coating (20) is conducted for the particular elevated round wire (14).

* * * * *